United States Patent [19]

Valentino et al.

[11] Patent Number: 4,883,361
[45] Date of Patent: Nov. 28, 1989

[54] DOUGH PROCESSING APPARATUS

[75] Inventors: Frank Valentino, Hickory Hills, Ill.; David E. Betts, Pataskala, Ohio; Edward A. Alesch, Richardson, Tex.

[73] Assignee: B-V Dough Handling Systems, Inc., Pataskala, Ohio

[21] Appl. No.: 204,385

[22] Filed: Jun. 9, 1988

[51] Int. Cl.⁴ .............................. B01F 7/02; B01F 7/04; B01F 15/02
[52] U.S. Cl. ...................................... 366/97; 366/297; 366/300; 366/301
[58] Field of Search ....................... 366/66, 76, 77, 96, 366/97, 292, 297–301, 603; 99/348; 425/200, 204, 209, 238

[56] References Cited

U.S. PATENT DOCUMENTS

| | | | |
|---|---|---|---|
| 1,963,259 | 6/1934 | Carl | 366/300 |
| 2,081,850 | 5/1937 | Darby et al. | 366/297 |
| 2,102,255 | 12/1937 | Campbell | 366/300 X |
| 2,964,391 | 12/1960 | Benson | 366/301 X |
| 3,498,762 | 3/1970 | Van der Schee et al. | 366/301 X |
| 3,640,509 | 2/1972 | Inamura et al. | 366/301 X |
| 3,650,511 | 3/1972 | Henschel | 366/298 |
| 3,941,357 | 3/1976 | Wurtz | 366/301 X |
| 4,281,934 | 8/1981 | Krause et al. | 366/300 X |
| 4,493,557 | 1/1985 | Nayak et al. | 366/300 |
| 4,776,703 | 10/1988 | Oda et al. | 366/97 |

Primary Examiner—Timothy F. Simone
Attorney, Agent, or Firm—Robert E. Stebens

[57] ABSTRACT

A dough developer is provided having an elongated chamber and a pair of dough conditioning rotors extending axially of the chamber. An inlet and an outlet are provided at respective opposite ends of the chamber to permit dough to be pumped through the chamber. A plurality of conditioning bars are mounted on a respective shaft of each rotor and extend radially outward therefrom with these bars axially disposed as between the two rotors so that bars revolve in overlapping planes. Each of the conditioning bars is of a U-shaped configuration formed from a cylindrical rod with the conditioning bars disposed in planes extending substantially axially relative to the rotors.

15 Claims, 6 Drawing Sheets

4,883,361

DOUGH PROCESSING APPARATUS

FIELD OF THE INVENTION

This invention relates in general to apparatus for processing of dough of a type that is designed to be utilized in preparation of back products such as bread and rolls. It relates more particularly to apparatus for a conditioning of such dough which is initially mixed and blended by other apparatus and is conveyed through conduits by means of pumps to a forming station that places formed dough into baking apparatus and is intended to condition the dough to achieve the most desirable characteristics and obtaining improved quality of products.

BACKGROUND OF THE INVENTION

Production of dough for making of various types of bake products, particularly bread and roll type products, has traditionally utilized what is termed the batch type process. This process involves the forming of a predetermined quantity of dough which in bakeries for producing large quantities of the product may involve a batch that is of the order of 500 pounds. This dough, once it is mixed and blended, is then utilized by feeding it into apparatus that will mechanically divide the dough into the desired portions for forming of the particular product. Once the portions of dough are formed, these may be then subjected to further mechanical operation in forming them into the desired shapes and configurations which are placed in the baking pans. While the batch type process does provide control over obtaining a batch of the dough having the desired characteristics such as consistency, such dough products having yeast as an ingredient results in a constant change in the characteristics of the dough during the time periods normally involved in utilizing that quantity of dough. There will be a significant change in the characteristics of the dough as between the first portions which are most likely the ideal and the last portions.

There have been attempts to automate the operations to effect economy in time and in particular as to cost. Automation of baking operations necessitates mechanical handling and conveying of the dough from a mixing station to a utilization station which may include dividers and other portion forming equipment. To effect transport of the formed dough, mechanical pumps are incorporated into a tube-type conduit system to feed the dough from the mixing station to the utilization stations. A substantial disadvantage has been encountered in use of mechanical pumps for this purpose for many types of dough products in that the mechanical pumps tend to change the texture characteristics of the dough and result in a dough that does not provide the optimum quality in the baked products. Other characteristics of the dough that are adversely effected by the mechanical pumping action and conduit transport are the strength grain texture of the dough and which changes in characteristics carry over into the baked products themselves. Furthermore, lower quality dough has a significant adverse effect on the appearance of the bake product and in many cases also a substantial diminishing of shelf life.

The problem and disadvantages associated with automation through use of pump-type conveying or transport systems for the dough have been recognized and there have been some attempts to solve the problems. One solution has been to provide apparatus placed in downstream relationship to the pumping apparatus and prior to the utilization station to further process the dough. Typical of such apparatus are structures that include a chamber through which the dough is caused to flow and having mechanical agitating mechanisms that further operate on the dough. These agitating mechanisms have included structures in the form of crank devices and also of helical screw-type devices. However, the apparatus which has been employed has not been found to perform in a sufficiently satisfactory manner. Accordingly, the automated systems have generally not been employed in connection with dough that is utilized in baking of bread and roll type products.

SUMMARY OF THE INVENTION

In accordance with this invention, an apparatus is provided for inclusion in a dough transporting system to effect further development and conditioning of the dough that has been transported in a conduit system prior to its being deposited into machining apparatus that will form the dough into units that are then subjected to the baking operation. An illustrative embodiment of the apparatus includes an elongated chamber through which the transported dough is caused to axially flow and in which conditioning means in the form of elongated rotors for mechanical working of the dough as it flows through the chamber. Two such rotors are provided which extend in parallel relationship to each other with each of the rotors provided with dough conditioning elements. The dough conditioning elements are in the form of U-shaped bars which are disposed in axially spaced relationship on each of the respective rotors and upon being revolved mechanically work the dough. The conditioning elements or bars on the respective rotors are disposed in axially offset relationship as between the two rotors such that the bars revolve in overlapping planes as between the bars on the two rotors.

The conditioning bars are formed of lengths of cylindrical rigid rods that are bent into a U-shaped configuration and secured to an elongated shaft of a respective rotor to extend radially outward with respect to the rotor axis. Each of the bars is oriented to lie in a plane which intersects with the rotor shaft. The two shafts are positioned in predetermined spaced relationship such that the conditioning bars on each shaft will revolve with the outer extremities thereof moving in a path that passes closely adjacent to the opposed shaft. Each of the conditioning bars is positioned on a respective shaft such that it revolves in a plane that is axially displaced with respect to the plane of revolution of a conditioning bar on and opposed shaft. The two rotors may be revolved in the same direction or they may be counter-rotating and as a consequence of the passing of the conditioning bars through the dough they will effect further mixing of the dough as well as perform the desired function of conditioning the dough after it has been subjected to a transport operation as in an automated system.

An independent power drive dedicated to the operation of the dough conditioner is provided for effecting revolution of the rotors. The power drive is advantageously of the type which can be selectively adjusted to cause the rotors to revolve at a predetermined rate that is selected in accordance with the specific characteristics of the dough that is being conditioned. The rotational speed of the rotors is also adjusted in accordance with the flow rate of the dough that is being transported or caused to flow through the conditioner.

The conditioner is constructed in a manner which will enable and greatly facilitate cleaning of the unit at either periodic intervals or at times when the apparatus is not being used. This structure includes forming of the chamber with a top section that seals with a bottom section, but is removable for providing access to the interior and cleaning. The two rotor elements are mounted on the removable top section and are thus removed from the chamber where they are fully exposed to facilitate cleaning.

These and other objects and advantages of this invention will become readily apparent from the following detailed description of an illustrative embodiment thereof and the accompanying drawings.

DESCRIPTION OF THE DRAWING FIGURES

DESCRIPTION OF THE ILLUSTRATIVE EMBODIMENTS

Figure 1:
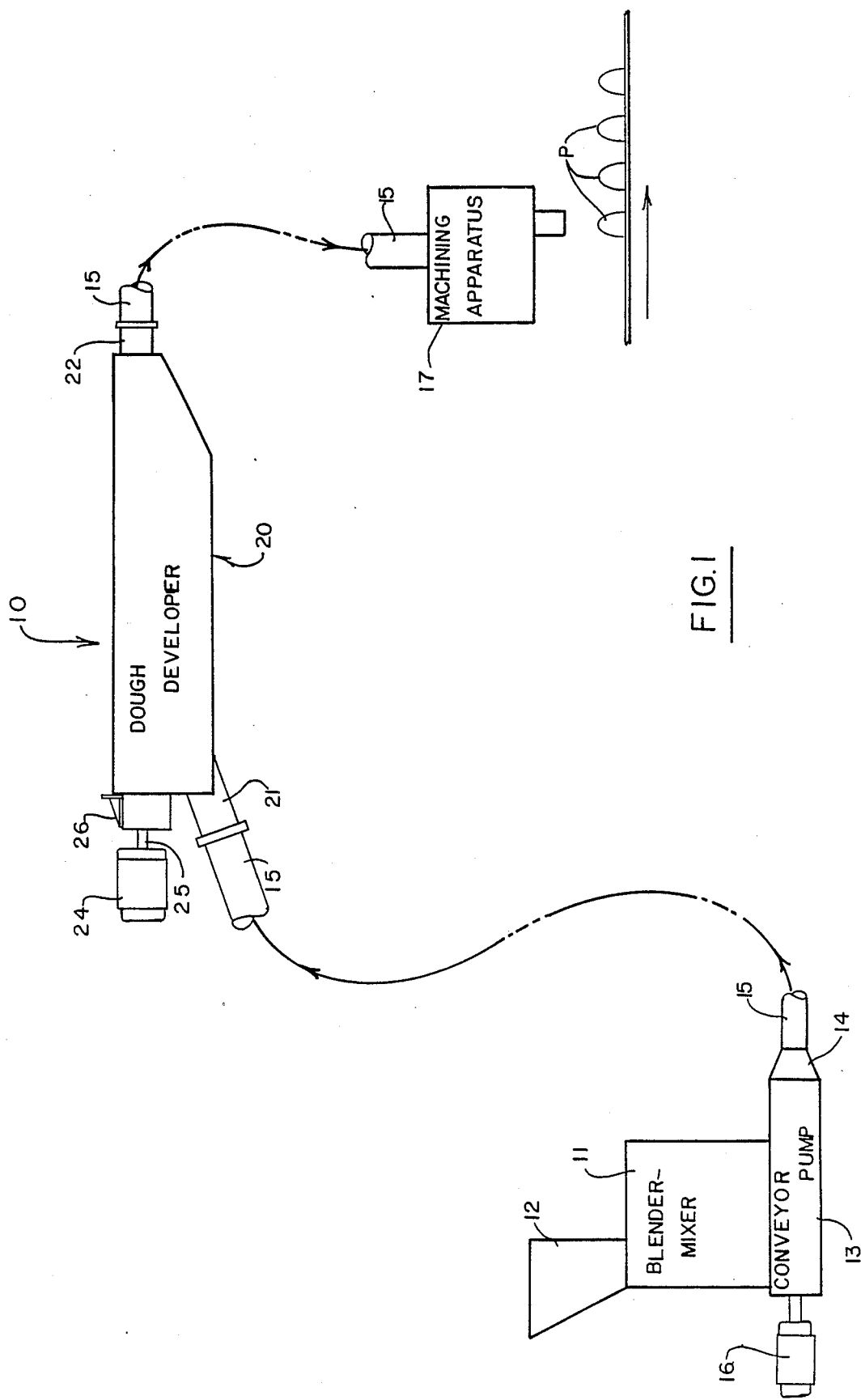
FIG. 1 is a diagrammatic illustration of a dough developer embodying the invention interposed in an automated dough handling system with the developer shown in side elevation.
Figure 2:
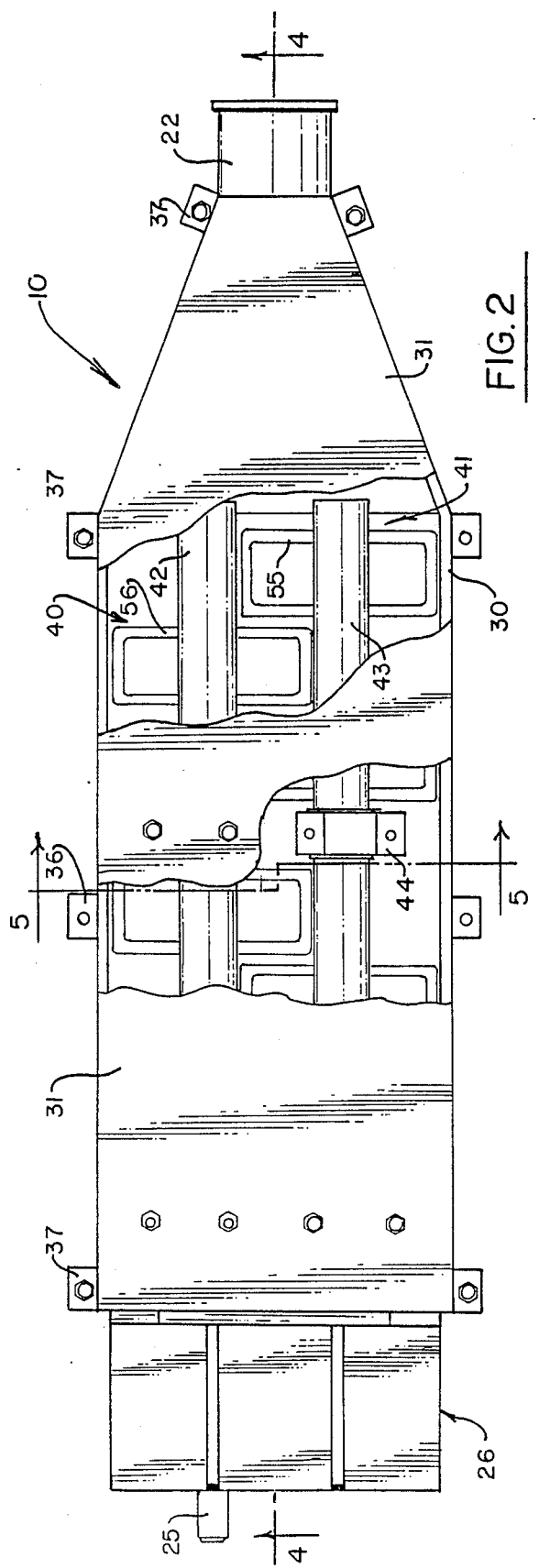
FIG. 2 is a top plan view of the developer on a substantially enlarged scale.

Referring to FIG. 1, a dough developer embodying the invention and generally designated by the numeral 10 is shown interposed in a typical automated dough forming and handling system. A typical system, as is illustrated, includes a blender or mixer 11 which is adapted to receive the ingredients through an inlet 12 and performs the function of mixing those ingredients. Coupled with the mixer is a conveyor pump 13 which receives the mixed dough and discharges at an outlet 14 and into a dough transporting conduit 15. A typical pump utilized for conveying of dough in automated processing systems may comprise an elongated chamber in which one or more helical screws are positioned for effecting axial displacement of the dough that is received and to force it out of the outlet and through the conveying conduit. Such a pump is generally provided with a power drive such as an electric motor 16.

Dough that is transported in the system and processed in the dough developer ultimately feeds into a machining apparatus indicated generally by the numeral 17. The machining apparatus functions to form the dough into units of desired size and configuration for production of the particular baked article. This apparatus is diagrammatically shown as forming articles in the form of a loaf as in production of bread-type products. These formed loaves are deposited onto a baking surface which is subsequently transported through an appropriate oven. The specifics of the machining apparatus as well as other components associated with the baking operation do not form a part of the invention and are therefore not further illustrated or described. It is to be understood that the particular machining apparatus selected for a particular installation will be appropriate for handling of the specific type dough being processed and forming of the particular product.

A dough developer constructed in accordance with this invention comprises an elongated chamber designated generally by the numeral 20 having an inlet 21 at one end and an outlet 22 at the opposite end. Each of the inlet and outlet 21, 22 are provided with appropriate coupling means for connecting with the respective portions of the conduit 15. The coupling mechanisms are advantageously of the type which readily permit disassembly of the conduit 15 to facilitate cleaning and to then reconnect the conduit system. Mechanical power for operating the dough developer is conveniently obtained by means of an electric motor 24. This motor 24 is shown coupled by means of a drive shaft 25 to the input power section 26 mounted at the inlet end of the chamber 20. The input power section 26 as well as its coupling with the motor 24 will be subsequently described in greater detail.

Specifics of construction of the developer can be best seen by reference to FIGS. 2-6. The elongated chamber 20 includes a channel-shaped bottom section 30 which opens at the top and is covered by a top section 31 which is of a flat plate configuration. The bottom section 30 is generally U-shaped in transverse section as can be best seen in FIG. 5 throughout the greater part of its length and terminates in a upwardly converging end section 32 to which the outlet 22 is connected. A relatively thick steel plate is utilized in forming the bottom section as well as the top section to provide structural rigidity for the developer. A resilient sealing ring 33 is positioned in a receiving channel 34 extending around the top peripheral edge of the bottom section to provide a fluid impervious seal with respect to the top section. Mechanical interconnection of the bottom and top sections is effected by bolt-type fasteners 35 that extend through mating lugs 36 and 37 secured to the respective bottom and top sections on the exterior of the chamber. The screw-threaded bolts extend through apertures formed in the lugs on the top section and thread into sockets in the lugs 36 on the bottom section. Provided at the inlet end to the chamber is an end wall 38 which is secured in the bottom section 30 by suitable means such as welding. An opening 39 is formed in the bottom center of the end wall 38 with the inlet 21 connecting with the end wall at that opening. As can be best seen in FIGS. 1 and 4, the inlet 21 comprises a tubular section of the conduit and is disposed at a predetermined angle with respect to longitudinal axis of the chamber so that the dough flowing into the chamber enters at an upwardly directed angle.

Figure 4:
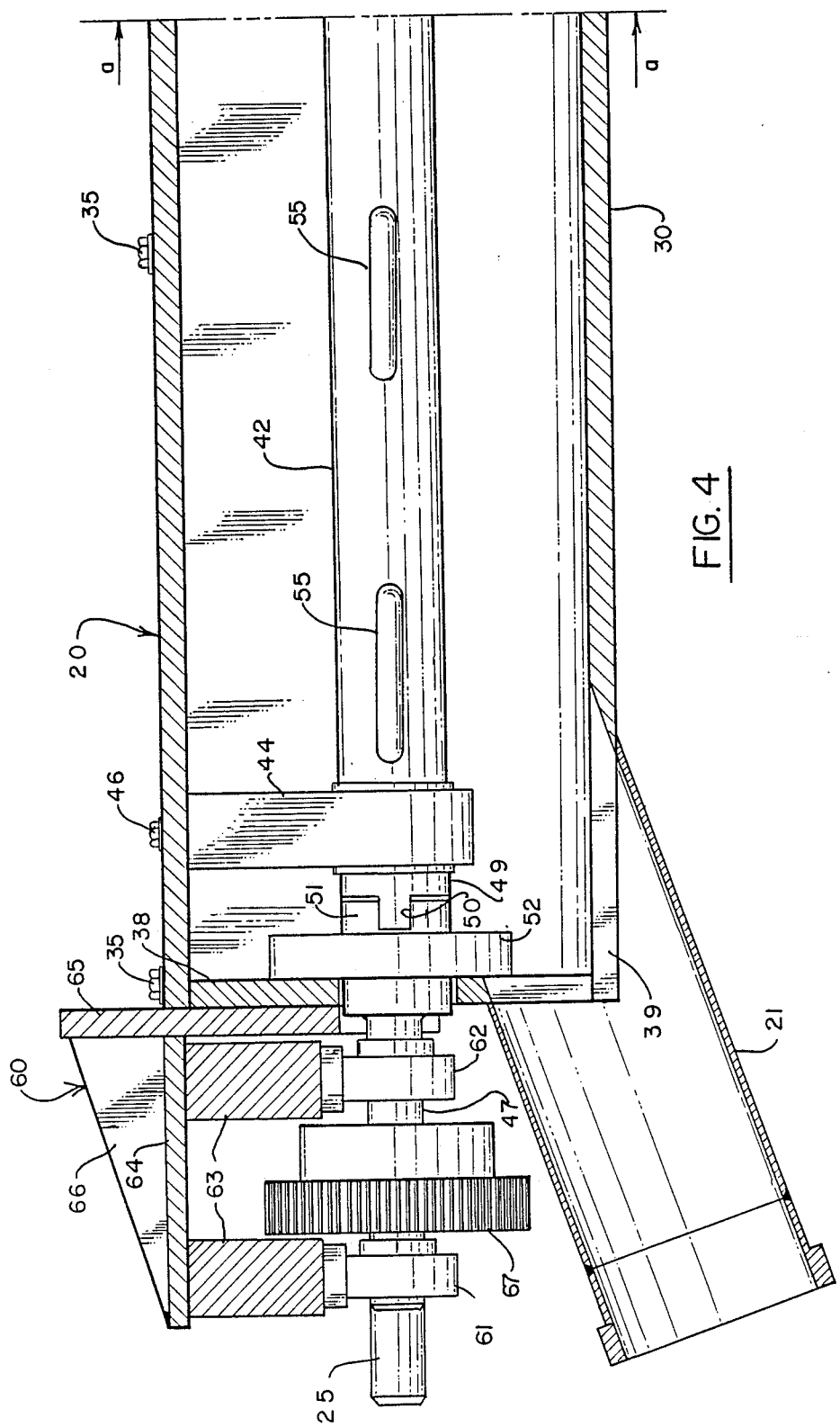
FIGS. 4 and 4a are a sectional view on an enlarged scale taken along line 4–4 of FIG. 2.
Figure 4A:
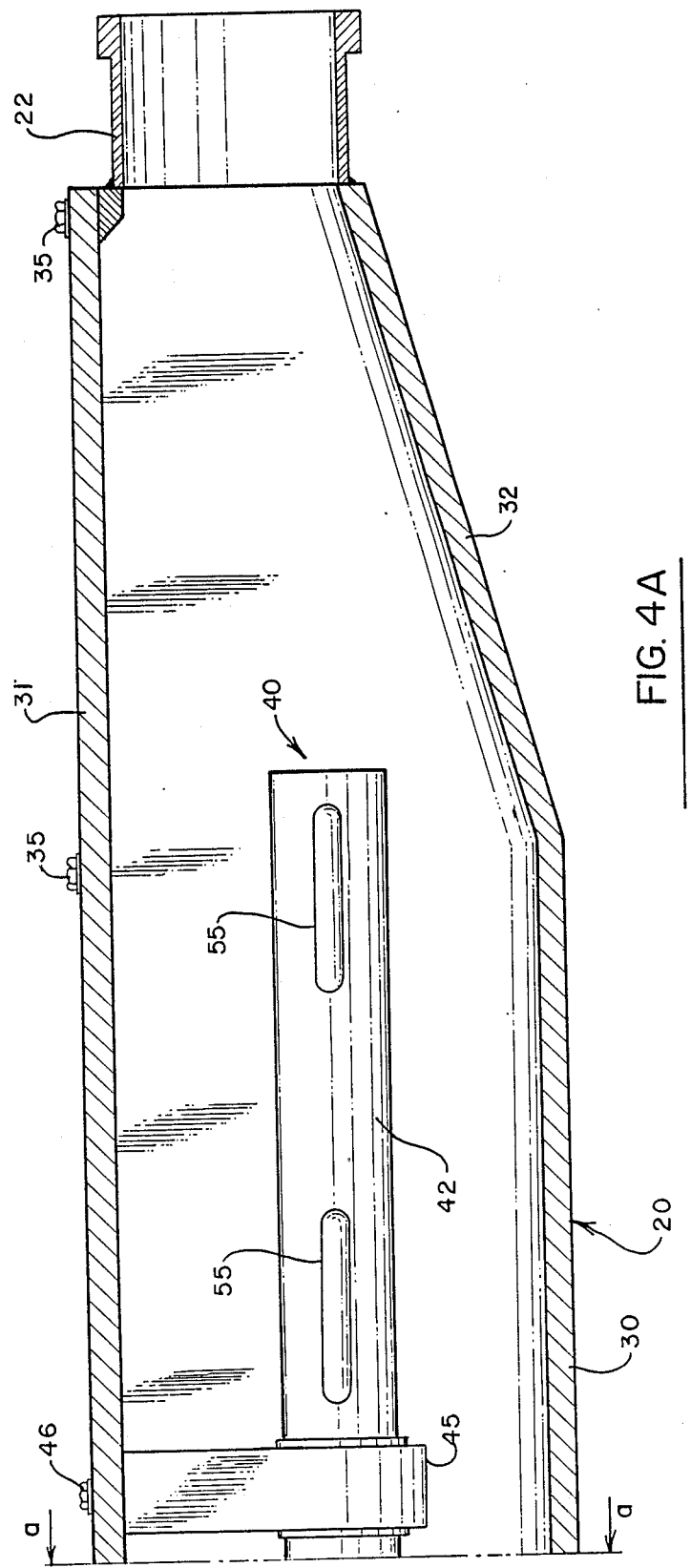

Positioned in the interior of the chamber 20 are two elongated rotor elements 40 and 41. Each of the rotors 40 and 41 includes an elongated cylindrical shaft 42, 43 that extend axially through the chamber in spaced parallel relationship and lying in a common horizontal plane. Supporting these shafts 42 and 43 are respective pairs of bearing brackets 44 and 45. These brackets are secured to the top section 31 of the chamber and extend a distance downwardly therefrom to support the shafts in predetermined relationship to the interior surface of the bottom section 30. These brackets may be of a split cap type construction to enable assembly with the respective shafts. Attachment of the brackets to the top section is effected by fastening devices such as screw-threaded cap screws 46. The one bracket 44 of each set is disposed adjacent the end wall 38 of the chamber, but spaced a distance inwardly as can be best seen in FIG. 4. The other bracket 45 of each set is disposed at an intermediate point within the chamber and supports the respective shaft 42, 43 at a point which is a distance inwardly from the opposite end. A driving connection from the input power section 26 is effected by means of a respective drive shaft 47 and 48 which extends through an aperture formed in the end wall 38. Mechanical coupling of the drive shafts 47, 48 with the respective rotor shafts 42, 43 is effected by a key-type mechanical interconnection which readily permits the rotor shafts to be disconnected and assembled to facilitate separation of the components and cleaning of the structure. This key-type interconnection as can be seen in FIG. 4 comprises a transverse slot 50 formed in each of the drive shafts 47, 48 and opening at the end and a tongue 51 projecting from the end of the rotor shafts and extending into the slots. Each of the drive shafts 47, 48 is provided with a respective fluid seal 52 mounted on the interior face of the end wall.

Figure 3:
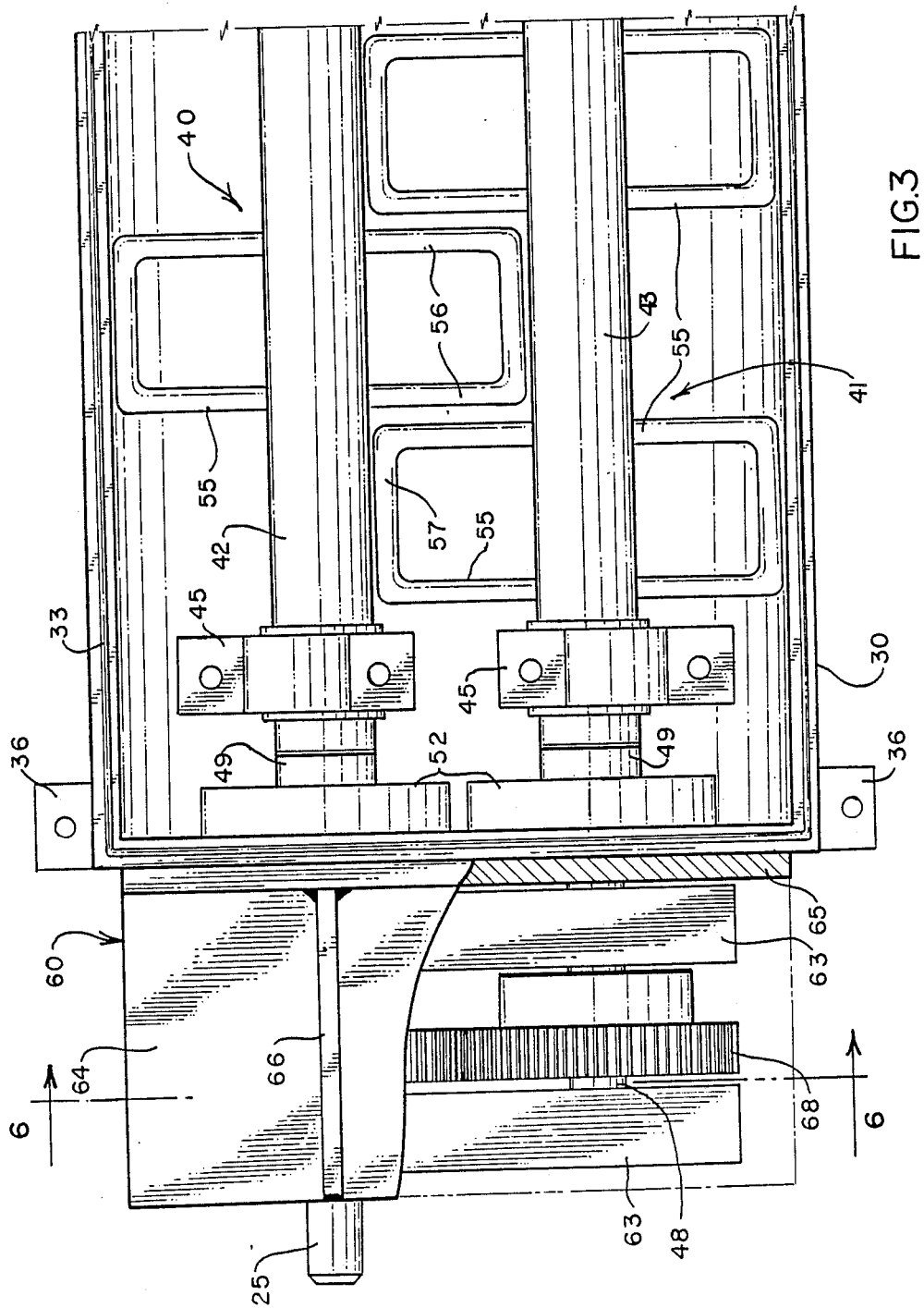
FIG. 3 is a top plan view of a fragmentary portion of the developer at the left side of FIG. 2 with portions of the top removed for clarity of illustration.
Figure 5:
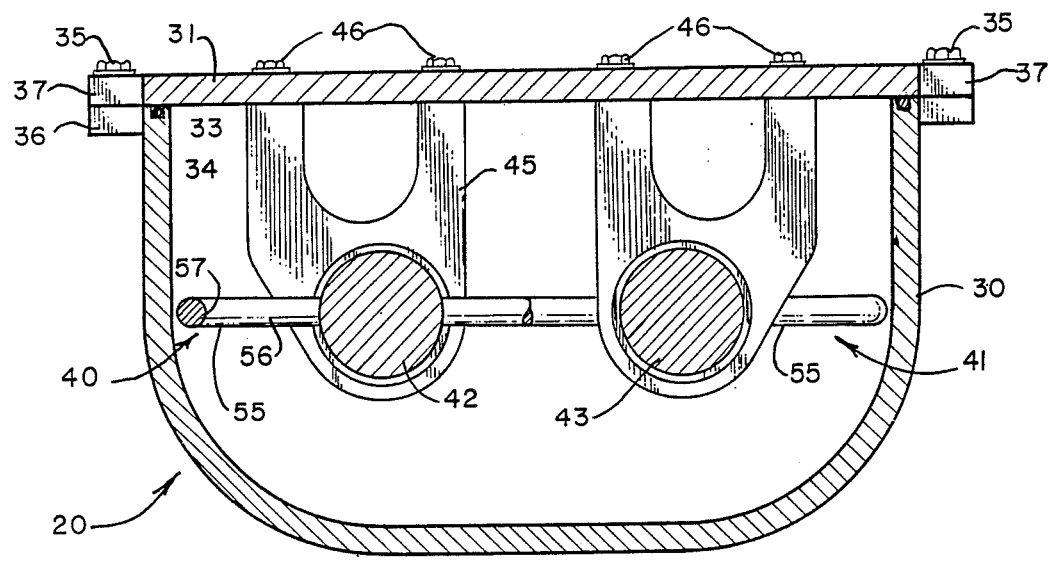
FIG. 5 is a sectional view taken along line 5–5 of FIG. 2.
Figure 6:
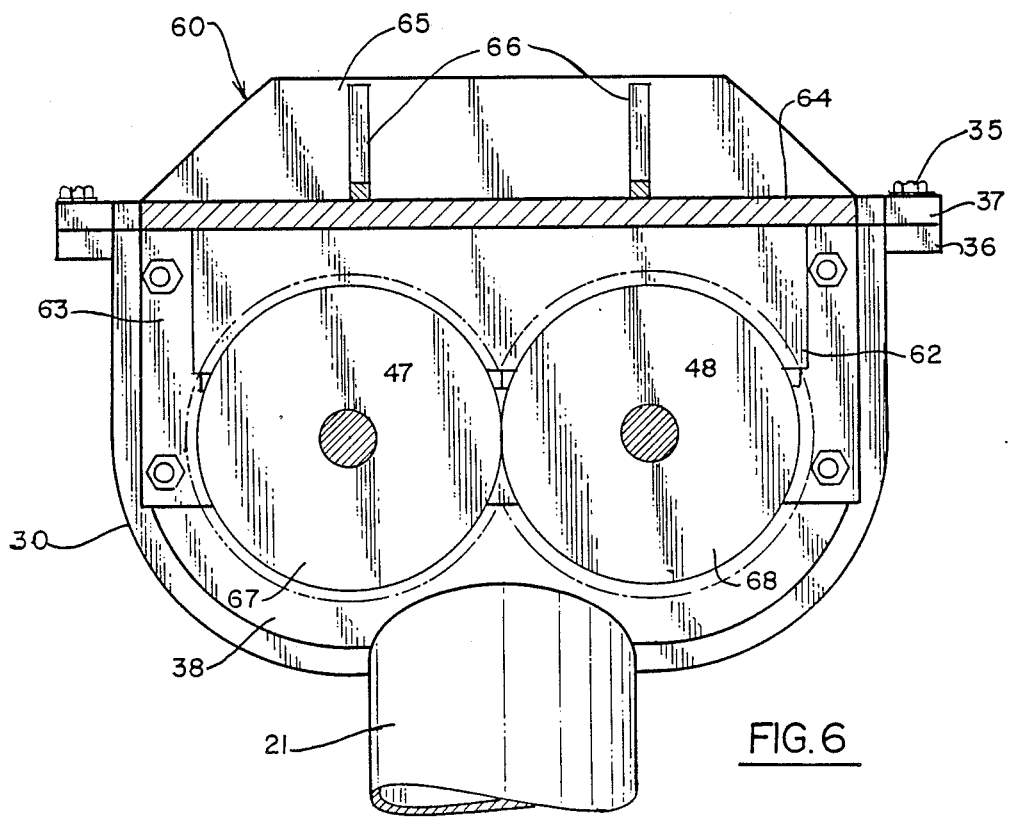
FIG. 6 is a sectional view taken along line 6–6 of FIG. 3.

Carried on each of the rotor shafts 42, 43 are a number of elements which are described as conditioning bars 55. These conditioning bars are formed from cylindrical rods that are bent into a U-shaped configuration having spaced apart legs 56 that are interconnected by a base portion 57 to a surface of the respective shaft. Each of the conditioning bars 55 is secured to a respective one of the rotor shafts 42, 43 as by welding of the terminal ends of the legs 56 to the exterior of the shaft. Each of the conditioning bars 55 is oriented with respect to the shaft to project radially outward from the shaft. In the embodiment of the developer shown in FIGS. 2-5, the conditioning bars 55 are arranged in pairs disposed in diametrical relationship at opposite sides of the shaft and adjacent sets are disposed in spaced relationship a distance sufficient to permit the conditioning bar mounted on the opposite rotor shaft to pass between each such pair. Also, the bars are relatively arranged on each respective rotor shaft to lie in a common plane. In an illustrative embodiment of the structure, the rotor shafts are of a two inch diameter and each of the conditioning bars 55 projects a distance of the order of three inches outwardly from the bar. The bars are formed from rods that are of the order of one half inch in diameter with the legs 56 being spaced apart a distance of the order of three and one half inches. Thus, as can be seen in FIGS. 3 and 5, the rotors have an effective operating diameter of the order of eight inches. The bottom section of the chamber is configured to have the interior walls arcuately curved to conform to a portion of the path of travel of the outer extremities of the conditioning bars. Each of the rotors is provided in the illustrative embodiment with four sets of the conditioning bars. These conditioning bars are relatively spaced on each shaft such that there will be a clearance of the order of one-fourth inch between opposed surfaces of respective sets of bars on the two shafts.

Rotation of the rotors 40, 41 is effected through the input power section 26 that is driven by the electric motor 24. A structural frame 60 of the input power section provides a base for mounting of the gear drive mechanism which couples the respective drive shafts 47 and 48 that connect with the rotors to the drive shaft 25 of the drive motor. Each of the shafts 47 and 48 extend a distance axially outward from the end wall 38 of the chamber and are journalled in respective pairs of bearing blocks 61 and 62. The bearing blocks 61 and 62 are in turn mounted on support blocks 63 and 64 which in turn are secured in spaced parallel relationship to the underside of a horizontal frame plate 64 of the structural frame. The horizontal frame plate 64 is fixed to a vertical mounting plate of the structural frame with that mounting plate adapted to be bolted to the rearward face of the end wall 38 of the chamber 20. A pair of reinforcement gussets 66 are welded to the vertical mounting plate and horizontal frame plate to rigidify the structural frame. Carried on each of the drive shafts 47 and 48 is a respective toothed gear 67 and 68 which are of a same diameter and of a size such that they will intermesh. Rotational movement is input from the motor 24 via drive shaft 25 to shaft 47 and transmitted to the other shaft 48 through the gears resulting in revolution of the rotors 40 and 41 in opposite directions.

Figure 7:
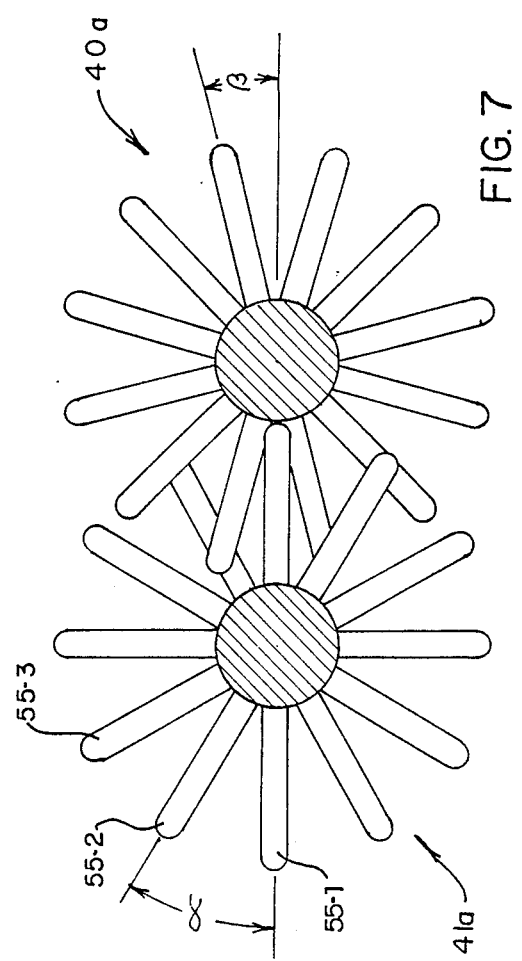
FIG. 7 is a transverse sectional view of a pair of modified rotor elements.

The rotors 40 and 41 heretofore described were formed with the conditioning bars 55 provided in diametrically opposed pairs. Depending upon the specific characteristics of a particular dough which is being processed and requires conditioning to obtain optimum qualities of the baked product, these rotors may be modified in various respects. To further improve operation of the apparatus, it may be advantageous to also mount the conditioning bars on a respective one of the shafts of a rotor in a manner such that they are not all oriented to lie in a common plane. Additional conditioning bars 55 may be provided in association with each of the illustrated pairs of conditioning bars or there may be only one such conditioning bar. Angularly displacing the sets of conditioning bars 55 as between the bars mounted on the single shaft tends to reduce the harmonic undulations that may be generated by the illustrated arrangement. This angular displacement is illustrated in FIG. 7 which is a transverse end view of the pairs of rotor shafts and showing the several conditioning bars angularly offset to an extent of 30 degrees. Also, the FIG. 7 modification shows the mounting of the bars or the orientation of the rotors themselves with respect to each other such that the bars are not symmetrically oriented. Referring to FIG. 7, it will be noted that one shaft is angularly displaced approximately 15 degrees from the other shaft with reference to the orientation of the conditioning bars.

The illustrative apparatus is shown and described as having an input power section 26 which results in rotation of the two rotor shafts in opposite directions. By modification of the gear mechanism such as by adding of an idler gear, it is possible to cause the two rotors to be revolved in the same rotational direction.

While the illustrative apparatus is shown with two rotors 40 and 41, the apparatus may be constructed to have three or more such rotors. For example, the apparatus could be constructed with a wider chamber 20 and have sufficient space to house three such rotors. The input power section would be modified accordingly to include additional gearing to effect the concurrent driving of the several rotors that may be provided in a particular developer.

Operation of the dough developer of this invention does not perform any transport function as to the dough being moved through an automated conduit system. The dough developer functions solely to further develop the dough and condition it to result in a dough having the appropriate characteristics for the particular product being baked. Employment of the dough developer results in conditioning of the dough at a point where it is to be machined and placed onto baking equipment resulting in the dough having a very highly consistent quality such that the final baked product will also be of the highest possible quality. Operation of the developer also provides added dough hydration. Remixing of the dough by the developer aids the further distribution of water and other functional ingredients throughout the mixture. The conditioning aspects of the developer have the important attribute of correcting the damage to the dough which results from the mechanical transporting through conduits and the effect of the pumps on the dough. Utilization of the dough developer of this invention has the further advantage in that the initial bulk mixing does not require the otherwise more critical attention as to the degree of mixed development as the operation of the developer will effect a final development to obtain the desired dough characteristics.

Various modifications in the development can be obtained in either or both the rotational speed of the rotors or the rate of movement of the dough through the developer chamber. Rotational speeds of the rotor in a prototype in the range of 40-160 rpm have been found suitable for proper development of dough with a flow rate of the order of 230 pounds per minute. These rotational speeds and flow rates are for purposes of illustration and are not to be considered limitative on the scope of the invention.

It will be readily apparent from the foregoing description of an illustrative embodiment that a dough developer is provided which is capable of providing substantial improvement in the development and conditioning of dough to obtain the highest quality products. Providing of rotors having sets of conditioning bars mounted thereon for interleaved operation produces mechanical mixing of the dough to further develop the texture and consistency of the dough to a desired specific degree. Various types of doughs can be readily accommodated through alterations in either or both the rotational speed of the rotors or the flow rate of the dough through the developer chamber.

Having thus described this invention what is claimed is:

1. Apparatus for developing dough comprising
an elongated chamber having an inlet at one end and an outlet at the opposite end whereby dough may be caused to flow axially therethrough,
dough conditioning means disposed in said chamber for developing the dough flowing through said chamber, said conditioning means including at least two elongated rotors extending axially through said chamber in side by side relationship to each other, each of said rotors having an elongated shaft and a plurality of dough conditioning bars mounted on said shaft, each of said bars being formed from a rigid rod bent into a substantially U-shaped configuration having two spaced apart legs and a web interconnecting said legs at one end with said legs secured at their opposite ends to a respective one of said shafts and projecting a distance laterally outward from said shaft thereby supporting the web in radially outward relationship to said shaft, said bars being oriented to place the legs thereof in a plane that extends substantially axially of the respective shaft and axially spaced apart on a shaft a distance to permit passage of a bar on the other shaft between a pair of adjacently disposed bars on the first mentioned shaft,
support means provided for each of said rotors for support of the rotors for revolution about their respective axes spaced a distance apart whereby the conditioning bars on each rotor shaft revolve in planes that overlap the plane of revolution of a next adjacent conditioning bar on the other rotor shaft, and
drive means mechanically coupled with said rotors for revolving said rotors.

2. Apparatus according to claim 1 wherein each of said rotors includes at least one other conditioning bar mounted on the respective shaft in radial alignment with each of the first mentioned conditioning bars.

3. Apparatus according to claim 1 wherein each of said rotors includes another conditioning bar mounted on the respective shaft in diametrically opposed relationship to each of the first mentioned conditioning bars.

4. Apparatus according to claim 3 wherein said conditioning bars on each rotor shaft are relatively angularly displaced with respect to a next adjacent conditioning bar.

5. Apparatus according to claim 1 wherein said conditioning bars on each rotor shaft are relatively angularly displaced with respect to a next adjacent conditioning bar.

6. Apparatus according to claim 1 wherein said rotors are oriented with respect to each other to have the conditioning bars on one rotor shaft align in a common plane with the conditioning bars on the other rotor shaft at the position where they pass each other.

7. Apparatus according to claim 1 wherein each of said conditioning bars is formed with a width of the order of three and one-half inches.

8. Apparatus according to claim 1 wherein said conditioning bars are spaced apart on their respective shafts a distance that is of the order of one-half inch wider than the width of a conditioning bar on the other rotor shaft that is to pass between two adjacently disposed bars on the first mentioned rotor shaft and is centered with respect to such space.

9. Apparatus according to claim 1 wherein each of said conditioning bars is formed with legs thereof disposed in parallel relationship and the web being substantially straight.

10. Apparatus according to claim 9 wherein said conditioning bars extend a distance outwardly from a respective shaft whereby the webs pass the outer surface of the other shaft in relatively close relationship.

11. Apparatus according to claim 10 wherein the spacing between a conditioning bar web and the outer surface of the other rotor shaft is of the order of one-fourth inch.

12. Apparatus according to claim 1 wherein the rods from which said conditioning bars are formed are round and have a diameter of the order of one-half inch.

13. Apparatus according to claim 1 wherein said drive means includes mechanical coupling means interconnecting with each of said rotor shafts for transmitting synchronous rotational movement thereto.

14. Apparatus according to claim 1 wherein said mechanical coupling means includes gear means for revolving said rotors in relatively opposite directions.

15. Apparatus according to claim 1 which includes means for causing dough to flow through said inlet into said chamber and continuously flow therethrough and discharge through said outlet.

* * * * *